United States Patent
Wada

(10) Patent No.: US 7,273,246 B2
(45) Date of Patent: Sep. 25, 2007

(54) ATTACHMENT STRUCTURE OF HEAD LAMP AND BUMPER FASCIA SIDE PORTION

(75) Inventor: Kazuya Wada, Tokyo (JP)

(73) Assignee: Calsonic Kansei Corporation, Tokyo (JP)

( * ) Notice: Subject to any disclaimer, the term of this patent is extended or adjusted under 35 U.S.C. 154(b) by 137 days.

(21) Appl. No.: 11/147,456

(22) Filed: Jun. 8, 2005

(65) Prior Publication Data

US 2005/0275250 A1    Dec. 15, 2005

(30) Foreign Application Priority Data

Jun. 9, 2004    (JP)  .............. 2004-171787

(51) Int. Cl.
*B60R 27/00*    (2006.01)
(52) U.S. Cl. ................................. 296/203.02
(58) Field of Classification Search .......... 296/193.09, 296/187.01, 187.09, 203.02
See application file for complete search history.

(56) References Cited

U.S. PATENT DOCUMENTS

| | | | | |
|---|---|---|---|---|
| 4,707,020 | A * | 11/1987 | Enokida et al. ............. | 296/191 |
| 6,450,276 | B1 * | 9/2002 | Latcau ....................... | 180/68.4 |
| 6,523,886 | B2 * | 2/2003 | Hoffner et al. ......... | 296/203.02 |
| 6,715,573 | B2 * | 4/2004 | Emori et al. ............... | 180/68.4 |
| 6,729,424 | B2 * | 5/2004 | Joutaki et al. ............. | 180/68.4 |
| 6,923,495 | B2 * | 8/2005 | Kishikawa et al. .... | 296/193.09 |
| 2001/0052210 | A1 * | 12/2001 | Mizutani et al. .............. | 52/208 |
| 2005/0088015 | A1 * | 4/2005 | Kishikawa et al. .... | 296/193.09 |
| 2005/0121146 | A1 | 6/2005 | Leonard et al. | |
| 2005/0247792 | A1 | 11/2005 | Benton et al. | |
| 2005/0274458 | A1 | 12/2005 | Carver et al. | |
| 2005/0275227 | A1 * | 12/2005 | Ahn .......................... | 293/155 |
| 2005/0275248 | A1 * | 12/2005 | Lee ....................... | 296/193.09 |
| 2005/0275250 | A1 * | 12/2005 | Wada .................... | 296/203.02 |
| 2006/0056900 | A1 | 3/2006 | Itakura | |

FOREIGN PATENT DOCUMENTS

JP    2001-47934 A    2/2001

* cited by examiner

*Primary Examiner*—H Gutman
(74) *Attorney, Agent, or Firm*—Foley & Lardner LLP

(57) ABSTRACT

Attaching portions of a head lamp are fixed to a radiator core support at three fixing portions at a front inside, a front outside, and a rear side respectively, and one of both side portions of a bumper fascia is fixed by a holding clip to the vicinity of a fixing portion at the front outside of the head lamp. Further, the fixing portion at the front outside of the head lamp is constituted of a first bracket of a separate body, which is position-adjustable and fixable so that the fixing portion at the front outside of the head lamp is arranged to a predetermined position with respect to the radiator core support, and a second bracket, to which the holding clip is attached, is constructed to be position-adjustable and fixable at least in the vertical direction of a vehicle with respect to the first bracket.

2 Claims, 4 Drawing Sheets

F I G. 3
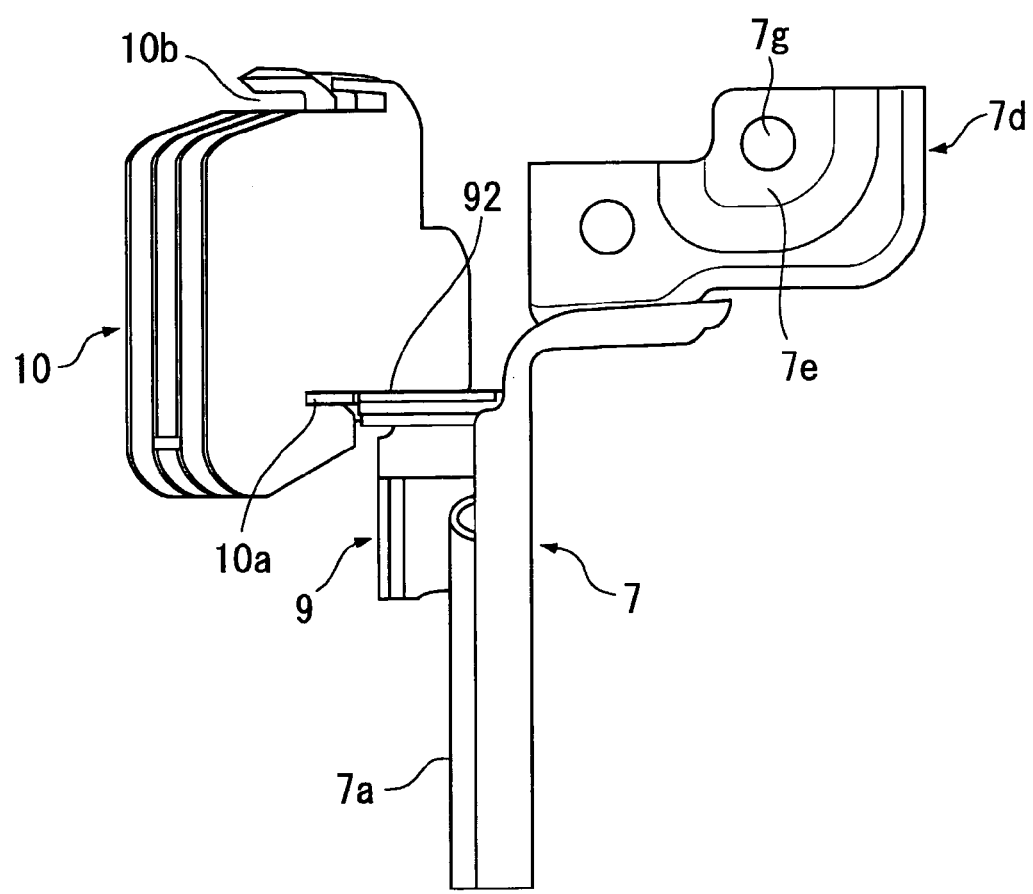

ATTACHMENT STRUCTURE OF HEAD LAMP AND BUMPER FASCIA SIDE PORTION

BACKGROUND OF THE INVENTION

1. Field of the Invention

The present invention relates to an attachment structure of a head lamp and a bumper fascia side portion, which are attached to a radiator core support of a front end module for a motor vehicle body.

2. Description of the Related Art

Conventionally, head lamps of an automobile are, as know from Japanese Patent Application Laid-open No. 2001-47934, attached to a radiator core support in an assembling production line of front end module for a motor vehicle body and thereafter assembled together with the radiator core support to the vehicle body.

When attaching the head lamps to the radiator core support, it is necessary to fix the head lamps to the radiator core support in a precisely positioned state.

For that purpose, three or more fixing portions are set for fixing a head lamp on the radiator core support. In a state that any one or two of three axes (in a width direction, a forward and backward direction, and a vertical direction of a motor vehicle) of the respective fixing portions is/are precisely positioned, the head lamp is fixed to the respective fixing portions, thereby precisely attaching the head lamp to the radiator core support.

On the other hand, the bumper fascia is held to the radiator core support at its both side portions by clips provided on the core support.

However, in the prior invention, positioning of the fixing portions of the radiator core support depends on product precision of the radiator core support, and thus it is necessary to carry out positioning of each fixing portion using a jig or the like when forming variation of the radiator core support or product variation, assembly variation or component unit variation of the head lamp, or the like occurs, which causes a problem of requiring long assembly time and much labor.

In addition, when a design of a vehicle is different, positions to hold the both side portions of the bumper fascia on the radiator core support by the clips also become different in the vertical direction of the vehicle, which causes a problem of requiring a new setting of the radiator core support according to the difference in design.

It is an object of the present invention to provide an attachment structure of a head lamp and a bumper fascia side portion that are capable of precisely attaching a head lamp to a radiator core support, and also capable of meeting the change in design of the vehicle without newly setting the radiator core support when positions to hold both side portions of a bumper fascia on the radiator core support by clips become different in the vertical direction of a vehicle due to difference in design of the vehicle.

SUMMARY OF THE INVENTION

An attachment structure of a head lamp and a bumper fascia side portion according to the present invention has: a head lamp; a bumper fascia having a bumper fascia side portion at each side end thereof; and a radiator core support having at least three fixing portions at a front inside, a front outside, and a rear side where attaching portions of the head lamp are fixed to the radiator core support, the radiator core support having a first bracket of a separated body and a second bracket of a separated body; wherein the first bracket is position-adjustable and fixable so that the fixing portion at the front outside of the head lamp is arranged to a predetermined position with respect to the radiator core support, the second bracket being position-adjustable and fixable at least in the vertical direction of a vehicle with respect to the first bracket, and at least one of both side portions of the bumper fascia being fixed to the vicinity of the fixing portion at the front outside of the head lamp by a holding clip fixed to the second bracket.

In the attachment structure of the head lamp and the bumper fascia side portion, the attaching portions of the head lamp are fixed to the radiator core support at least by the three fixing portions at the front inside, the front outside, and the rear side, and the attachment structure has the first bracket of the separate body which is position adjustable and fixable so that the fixing portion at the front outside of the head lamp is arranged to a predetermined position with respect to the radiator core support. Therefore, the head lamp can be attached precisely to the radiator core support.

Further, each of the both side portions of the bumper fascia is fixed by the holding clip to the vicinity of the fixing portion at the front outside of the head lamp, and the second bracket, to which the holding clip is attached, is provided to be position adjustable and fixable at least in the vertical direction of the vehicle with respect to the first bracket. Thus, when positions to hold the both side portions of the bumper fascia on the radiator core support by the clips become different in the vertical direction of the vehicle due to difference in design of the vehicle, the attachment structure can correspond to the change in design of the vehicle without newly setting the radiator core support.

Preferably, the fixing portion at the front inside of the head lamp is a third bracket of a separate body which is position-adjustable and fixable to a predetermined position with respect to the radiator core support.

Therefore, by using the third bracket, the head lamp can be attached more precisely to the radiator core support.

BRIEF DESCRIPTION OF THE DRAWINGS

The objects, features and advantages of the present invention will become apparent as the description proceeds when taken in conjunction with the accompanying drawings, in which:

FIG. 3 is an enlarged front view showing a first bracket portion attached to a lower radiator core member of the radiator core support.

DETAILED DESCRIPTION OF THE PREFERRED EMBODIMENTS

Hereinafter, an embodiment of an attachment structure of a head lamp and a bumper fascia side portion according to the present invention will be described.

Figure 1:
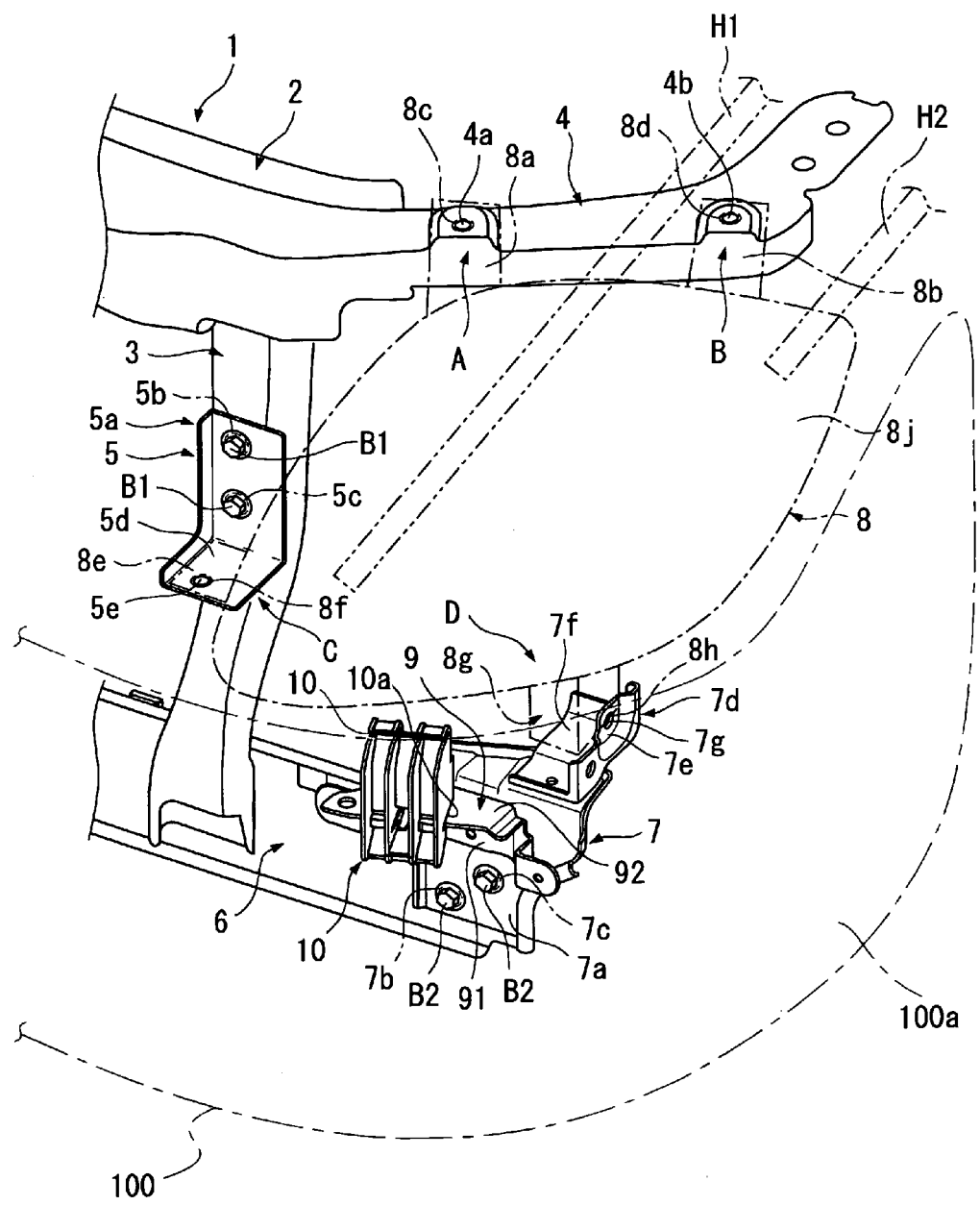
FIG. 1 is a perspective view showing an attachment structure of a head lamp and a bumper fascia of an embodiment according to the present invention.

Referring to FIG. 1, the attachment structure of a head lamp and a bumper fascia side portion of this embodiment has a radiator core support 1 with a first bracket 7, a second bracket 9 and a third bracket 5, a head lamp 8, and a holding clip 10.

The radiator core support 1 has an upper radiator core member 2 extending in a vehicle width direction, a lower radiator core member 6 arranged in parallel to and under the upper radiator core member 2, a not-shown hood lock stay coupling the upper radiator core member 2 and the lower radiator core member 6 at approximately middle portions thereof in the vertical direction, and side radiator core members 3, only one of which is shown, coupling both end portions of the upper radiator core member 2 and the lower core member 6 in the vertical direction, and it is entirely made of metal.

On the both end portions of the upper radiator core member 2, radiator core upper side portions 4 extending rearward of a vehicle are formed, and on the upper surface of each radiator core upper side portion 4, bolt insertion holes 4a and 4b are formed at two positions (fixing portions A and B on a rear side), which will be described later.

On each radiator core side 3, the third bracket 5 (fixing portion C on a front inside) of separate body is provided.

Figure 2:
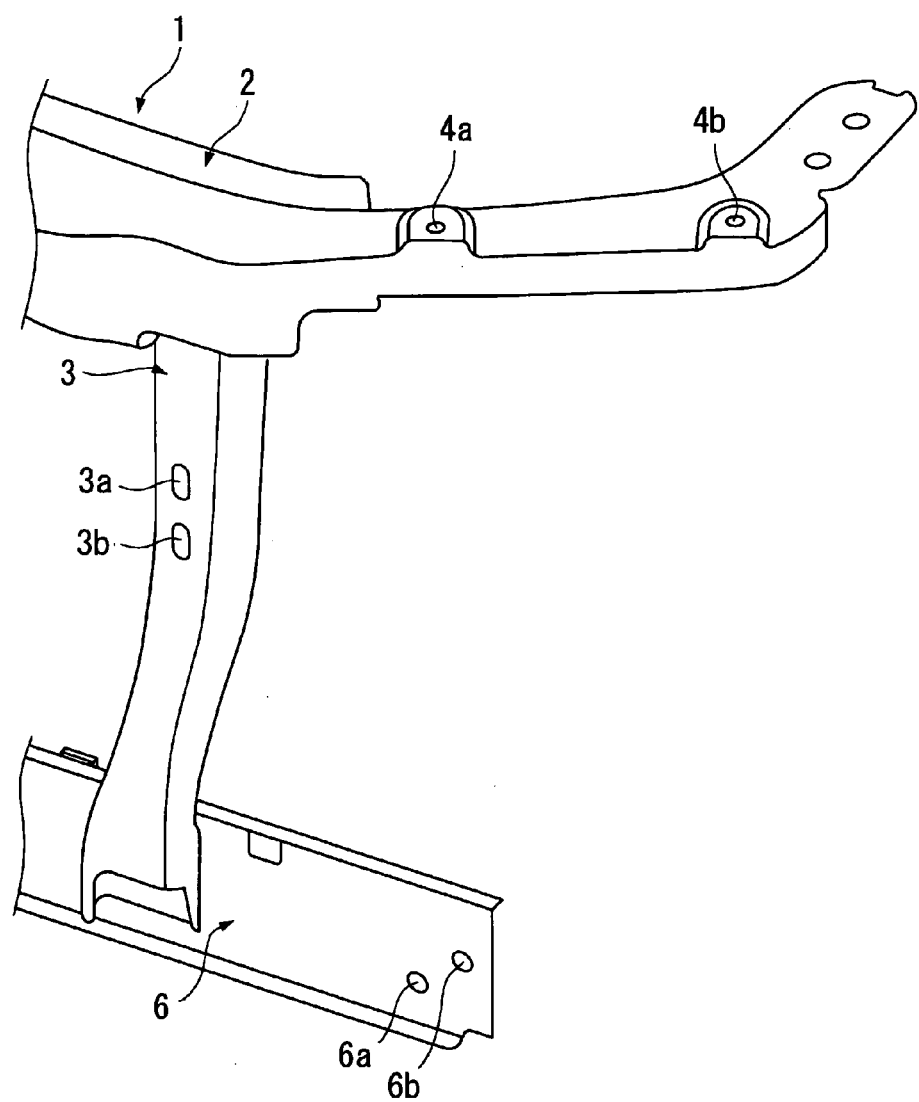
FIG. 2 is a perspective view showing a radiator core support before a separate bracket and the head lamp are attached.

The third bracket 5 is formed of a metal plate in an L-shape bending forward, and two bolt insertion holes 5b and 5c are formed on a side wall 5a thereof As shown in FIG. 2, on the side radiator core member 3, bolt insertion holes 3a and 3b corresponding to the bolt insertion holes 5b and 5c and each having a vertically long shape are formed. Bolts B1 and B1 are inserted from the front side of the bolt insertion holes 5b and 5c of the third bracket 5 into the bolt insertion holes 3a and 3b of the radiator core side 3 and fixed by nuts respectively to thereby allow determining and fixing of the third bracket 5 to a discretional position in the vertical direction on the radiator core side 3.

Referring to FIG. 1, on a bottom portion 5d of the third bracket 5, a bolt insertion hole 5e, which will be described later, is formed.

On a lower side of the radiator core support 1, the lower radiator core member 6 is formed, which is fixed on the side radiator core members 3 by welding and extends in the vehicle width direction.

On a tip of the lower radiator core member 6, the first bracket 7 (fixing portion D on a front outside) of separate body is provided.

On the front side of a base 7a of this first bracket 7, two bolt insertion holes 7b, 7c are formed.

As shown in FIG. 2, bolt insertion holes 6a and 6b corresponding to the bolt insertion holes 7b and 7c respectively and each having a larger diameter than the bolt insertion holes 7b and 7c are formed on the lower radiator core member 6. Bolts B2 and B2 are inserted through the bolt insertion holes 7b and 7c of the first bracket 7 into the bolt insertion holes 6a and 6b of the lower radiator core member 6 and fixed by nuts respectively to thereby allow determining and fixing of the first bracket 7 to a discretional position in the vehicle width direction and in the vertical direction on the lower radiator core member 6.

On an upper side of the base 7a of the first bracket 7, a projecting portion 7d is formed, which is fixed to an upper surface of the base 7a by welding. The projecting portion 7d is formed in an L-shape bending in the vehicle width direction, and a bolt insertion hole 7g, which will be described later, is formed on a side wall 7e thereof.

The head lamp 8, shown by a dashed line in FIG. 1, is assembled integrally in advance on a part production line of the vehicle such that a head lamp room, in which a not-shown head lamp bulb is attached, and so on are enclosed by an outer lens on a front portion and a head lamp housing on a rear portion.

The head lamp 8 is fixed to the radiator core support 1 by the fixing portions A to D at four positions in total, which are the two positions on the radiator core upper side portion 4, the side radiator core member 3, and the lower radiator core member 6.

The fixing portions A to D at four positions on the head lamp 8 will be described in detail below.

On a rear side upper portion of the head lamp 8, attaching portions 8a and 8b in a plate shape are formed respectively, and on tips of both the attaching portions 8a and 8b, bolt insertion holes 8c and 8d corresponding to the bolt insertion holes 4a and 4b of the radiator core upper side portion 4 are formed respectively. Bolts are inserted through the bolt insertion holes 8c and 8d into the bolt insertion holes 4a, 4b of the radiator core upper side portion 4 and fixed by nuts, thereby fixing the rear side upper portion of the head lamp 8.

On the front inside of the head lamp 8, an attaching portion 8e in a plate shape is formed, and on a tip of the attaching portion 8e, a bolt insertion hole 8f corresponding to the bolt insertion hole 5e of the bottom portion 5d of the third bracket 5 is formed. A bolt is inserted through the bolt insertion hole 8f into the bolt insertion hole 5e of the third bracket 5 and fixed by nuts, thereby fixing the front inner side of the head lamp 8.

Further, on a front outside lower portion of the head lamp 8, an attaching portion 8g in a rectangular shape is formed, and on the attaching portion 8g, a bolt insertion hole 8h corresponding to the bolt insertion hole 7g of the side wall 7e of the first bracket 7 is formed. A bolt is inserted through the bolt insertion hole 7g into the bolt insertion hole 8h of the first bracket 7 and fixed by nuts, thereby fixing the front outside lower portion of the head lamp 8.

Further, on an upper front surface of the base 7a of the first bracket 7, the second bracket 9 of separate body for holding a bumper fascia is attached. In this embodiment, according to outer profile design of a vehicle, the second bracket 9 is attached and fixed in advance to a predetermined position by welding.

Figure 4:
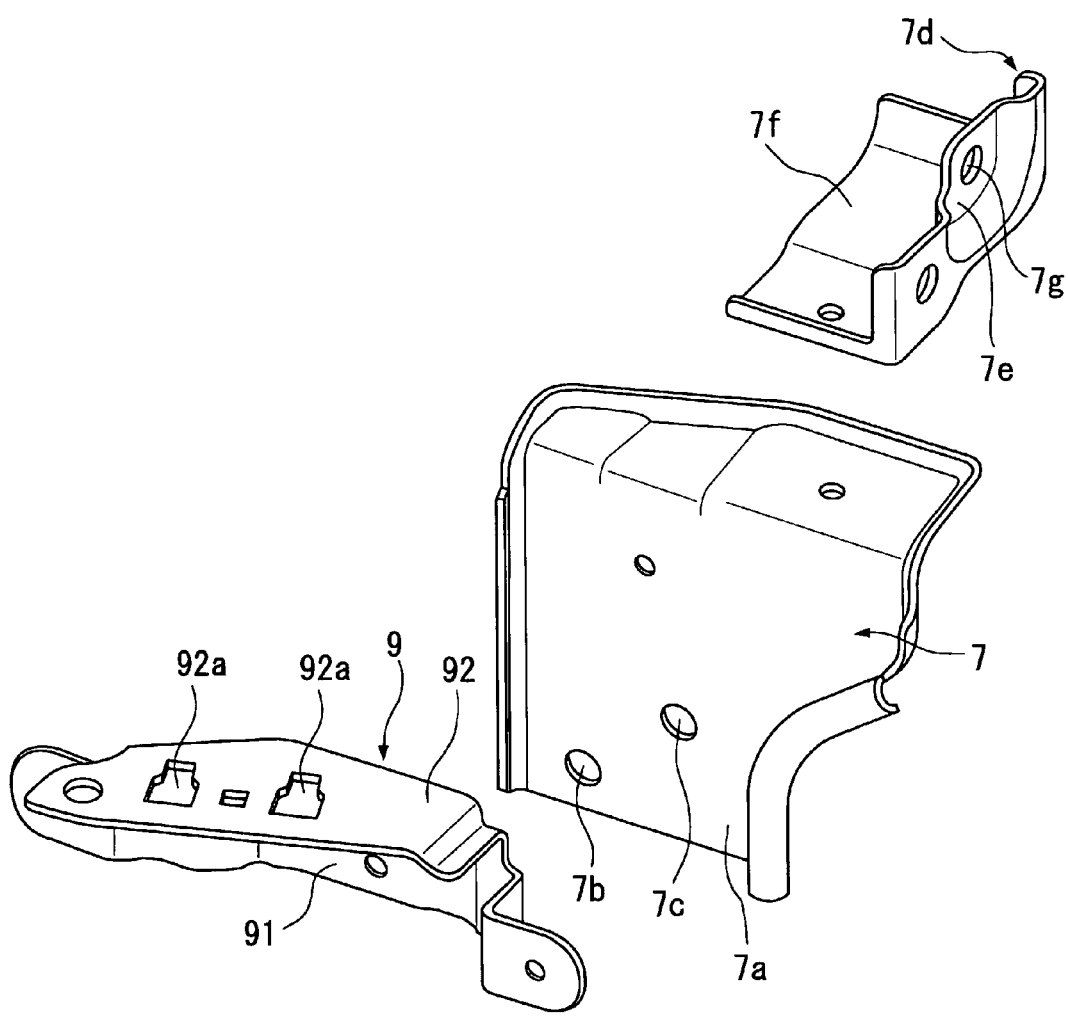
FIG. 4 is an exploded perspective view showing the first bracket portion.

As shown in FIG. 4, on the second bracket 9, a clip attaching portion 92 is provided to extend forward horizontally from an upper end portion of a base 91 located alongside of the upper front surface of the base 7a of the first bracket 7, and to this clip attaching portion 92, a holding clip 10 for holding side portion 100a of a bumper fascia 100 can be attached as shown in FIG. 1.

As shown in FIG. 3, on this holding clip 10, a slit 10a in which the clip attaching portion 92 of the second bracket 9 can be fitted and held in an inserted state is formed at a lower portion thereof, and on the other hand, a slit 10b in which a not-shown holding piece formed on the side portion 100a of the bumper fascia 100 can be fitted and held in an inserted state is formed at an upper portion thereof.

On the clip attaching portion 92, engaging holes 92a are formed at two positions, and on the other hand, elastic engaging pieces which engage elastically with the engaging holes 92a are provided on the slit 10a side of the holding clip 10. By inserting the clip attaching portion 92 of the second bracket 9 into the slit 10a, the elastic engaging pieces engage with the engaging holes 92a, thereby creating a state that disengagement of the holding clip 10 is being prevented.

An engaging hole is formed also on the holding piece of the bumper fascia 100, and on the other hand, an elastic engaging piece which engages elastically with the engaging hole is provided on the slit 10*b* side of the holding clip 10. By inserting the holding piece of the bumper fascia 100 into the slit 10*b*, the elastic engaging piece engages with the engaging hole formed on the holding piece, thereby creating a state that disengagement of the bumper fascia 100 is being prevented.

Next, a step of attaching the head lamp 8 to the radiator core support 1 will be described.

First, as shown in FIG. 2, the radiator core support 1 in a state that the first bracket 7 and the third bracket 5 are removed is secured on an assembly table.

Next, there is arranged a bracket positioning jig for guiding the first bracket 7 and the third bracket 5 to predetermined positions with respect to the radiator core support 1 secured on the assembly table.

Next, as shown in FIG. 1, in a state that the third bracket 5 abuts on the bracket positioning jig, the third bracket 5 is fixed to the side radiator core member 3 by the bolts B1 and B1.

At this time, the bracket positioning jig determines a position of the third bracket 5 in the vertical direction to a predetermined position.

Next, in a state that the first bracket 7 abuts on the bracket positioning jig, the first bracket 7 is fixed to the radiator core lower 6 by the bolts B2 and B2.

At this time, the bracket positioning jig determines positions of the first bracket 7 in the vehicle width direction and in the vertical direction to predetermined positions.

Next, the radiator core support 1 is secured on a head lamp assembly table for fixing the head lamp 8 to the radiator core support 1.

Next, there are arranged head lamp positioning jigs H1 and H2 for guiding the head lamp 8 to an appropriate position with respect to the radiator core support 1 secured on the head lamp assembly table.

Next, after the attaching portions 8*e* and 8*g* of the head lamp 8 are placed on the bottom portions 5*d* and 7*f* of the third bracket 5 and the first bracket 7, the head lamp 8 is pushed rearward until a rear side back surface 8*j* of the head lamp 8 abuts the head lamp positioning jigs.

Finally, the attaching portions 8*a*, 8*b*, 8*e*, and 8*g* of the head lamp are fixed by bolts and nuts, thereby fixing the head lamp 8 onto the radiator core support 1.

Next, a step of holding the side portion 100*a* of the bumper fascia 100 on the radiator core support 1 will be described.

First, the second bracket 9 is fixed by welding in a state of being positioned to a predetermined position on the upper front surface of the base 7*a* of the first bracket 7 in advance according to the design of the vehicle, and to the clip attaching portion 92 of this second bracket 9, the holding clip 10 for holding the side portion 100*a* of the bumper fascia 100 is attached. In this attachment, by inserting the clip attaching portion 92 into the slit 10*a* formed on the lower portion of the holding clip 10, the elastic engaging pieces provided on the slit 10*a* side of the holding clip 10 engage elastically with the engaging holes 92*a* formed on the clip attaching portion 92, thereby creating a state that disengagement of the holding clip 10 is being prevented. Thus, the attachment of the clip is completed.

Next, by inserting the holding piece provided on the side portion 100*a* of the bumper fascia 100 into the slit 10*b* formed on the upper portion of the holding clip 10, the elastic engaging piece formed on the slit 10*b* side of the holding clip 10 engages elastically with the engaging hole formed on the holding piece, thereby creating a state that disengagement of the holding piece is being prevented. Thus, the holding of the side portion 100*a* of the bumper fascia 100 is completed.

As has been described in detail above, in the attachment structure of the head lamp and the bumper fascia of this embodiment, after the head lamp 8 is positioned in the vertical direction by the third bracket 5, the head lamp 8 is positioned in the vertical direction and in the vehicle width direction by the first bracket 7. Then, the head lamp 8 is placed on the first bracket 7 and the third bracket 5 and is pushed until the rear side back surface of the head lamp 8 abuts the head lamp positioning jigs H1 and H2. Therefore, the head lamp 8 can be positioned and attached precisely to the radiator core support 1 by a simple operation.

Further, each of the both side portions 100*a* of the bumper fascia 100 is fixed by the holding clip 10 to the vicinity of the fixing portion D at the front inside of the head lamp 8, and the second bracket 9 to which the holding clip 10 is attached is constructed to be position-adjustable and fixable at least in the vertical direction of a vehicle with respect to the first bracket 7. Thus, when positions to hold the both side portions 100*a* of the bumper fascia 100 on the radiator core support 1 by the holding clips 10 become different in the vertical direction of a vehicle due to difference in design of the vehicle, the attachment structure can correspond to the change in design of the vehicle without newly setting the radiator core support 1.

In the foregoing, an embodiment of the present invention has been described, but the specific structure of the present invention is not limited to this embodiment, and any design modification and so on in the range not departing from the spirit of the invention will be embraced in the present invention.

For example, in this embodiment, the third bracket 5 is provided on the side radiator core member 3, and the first bracket 7 is provided on the lower radiator core member 6, but their fixing positions may be set discretionally.

Further, in this embodiment, two of the first bracket 7 and the third bracket 5 are provided, the third bracket 5 determines the position of the head lamp 8 in the vertical direction, and thereafter the first bracket 7 determines the positions of the head lamp 8 in the vertical direction and in the vehicle width direction. However, when the bracket positioning jig is able to determine the positions of the third bracket 5 in the vertical direction and in the horizontal direction on the head lamp 8 simultaneously with high precision, the first bracket 7 may be in a state of being fixed to the lower radiator core member 6.

Further, in this embodiment, weld nuts may be provided at the positions of the bolt insertion holes 3*a*, 3*b*, 6*a*, 6*b* where the first bracket 7 and the third bracket 5 are fixed, the bolt insertion holes 5*b* and 5*c* of the third bracket 5 may be formed as a vertically long holes, and the bolt insertion holes 7*b* and 7*c* of the first bracket 7 may be formed with a larger diameter than that of the bolt insertion holes 6*a* and 6*b*, so as to fix the bolts B1 and B2 to the weld nuts, respectively.

Further, in this embodiment, the second bracket 9 is fixed at a predetermined position on the first bracket 7 by welding in advance, but the second bracket 9 may be fastened and fixed by a bolt and a nut in a state that its position is determined to a discretional position with respect to a large diameter hole formed on the base 7*a* of the first bracket 7.

Further, in this embodiment, all the components of the radiator core support 1 are made of metal, but a part or all of them may be made of resin. Further, other parts are also not limited to be made of metal or resin. Moreover, the fixing method can be appropriately chosen from weld fixing, bolt fixing, and nut fixing.

The entire contents of Japanese Patent Application No. 2004-171787 filed Jun. 9, 2004 is incorporated herein by reference.

What is claimed is:

1. An attachment structure of a head lamp and a bumper fascia side portion, comprising:
   a head lamp provided with attaching portions;
   a bumper fascia having a bumper fascia side portion at each side end thereof; and
   a radiator core support having at least three fixing portions, provided at a front inside, a front outside, and a rear side of the radiator core support, wherein the attaching portions of the head lamp are fixed to the radiator core support, the radiator core support having a first bracket of a separated body and a second bracket of a separated body; wherein:
   the first bracket is position-adjustable and fixable so that the fixing portion at the front outside of the head lamp is arranged to a predetermined position with respect to the radiator core support,
   the second bracket being position-adjustable and fixable at least in a vertical direction of a vehicle with respect to the first bracket, and
   at least one of both the bumper fascia side portions of the bumper fascia are fixed to a vicinity of the fixing portion at the front outside of the head lamp by a holding clip fixed to the second bracket.

2. The fixing structure of the head lamp and the bumper fascia side portion according to claim 1, wherein
   the fixing portion at the front inside of the head lamp is a third bracket of a separate body which is position-adjustable and fixable to a predetermined position with respect to the radiator core support.

* * * * *